No. 726,121. PATENTED APR. 21, 1903.
E. M. WALKER.
ANIMAL TRAP.
APPLICATION FILED MAY 29, 1902.
NO MODEL.
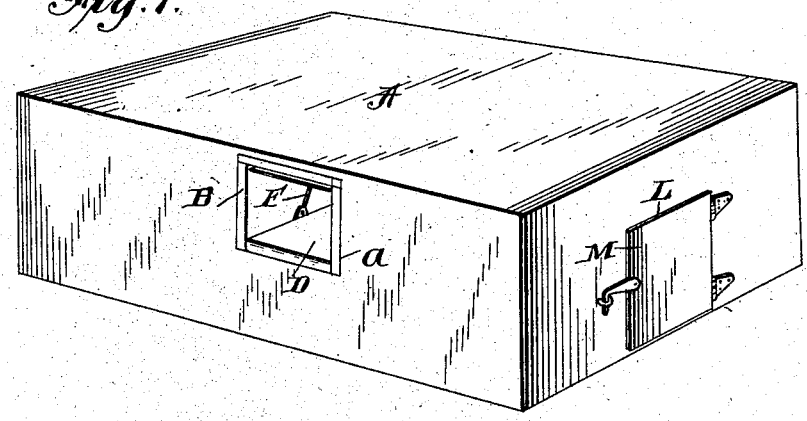
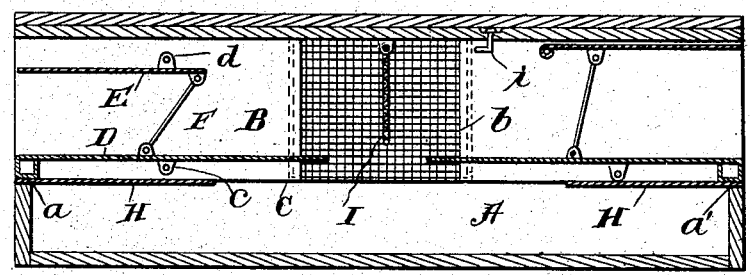
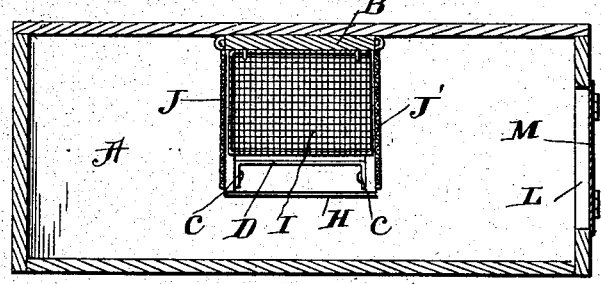
Witnesses
Geo. E. Frech.
Alice H. Hoffman
Inventor
E. M. Walker
By J. L. Pattison
Attorney

UNITED STATES PATENT OFFICE.

ELIAS M. WALKER, OF OATVILLE, KANSAS.

ANIMAL-TRAP.

SPECIFICATION forming part of Letters Patent No. 726,121, dated April 21, 1903.

Application filed May 29, 1902. Serial No. 109,479. (No model.)

*To all whom it may concern:*

Be it known that I, ELIAS M. WALKER, a citizen of the United States, residing at Oatville, in the county of Sedgwick and State of Kansas, have invented new and useful Improvements in Animal-Traps, of which the following is a specification.

My invention relates to improvements in animal-traps, and pertains more particularly to that class known as "self-set" and "ever-set."

My invention pertains to a trap having a runway extending entirely through the body of the trap and the ends thereof provided with a mechanism adapted to be closed by the weight of the animal.

In the accompanying drawings, Figure 1 is a perspective view of my trap. Fig. 2 is a transverse sectional view showing a modification at the right-hand end of the runway for closing the same. Fig. 3 is a longitudinal sectional view.

Referring now to the drawings, A represents the main body of the trap, which may be of any desired form, but, as shown, is made oblong and is provided at opposite sides with the oppositely-arranged openings a and a', which are a short distance above the bottom thereof for a purpose hereinafter more fully described. Removably extending through the said body portion and resting upon the lower walls of the openings a and a' is a runway B, which may be secured in any desired manner and which has its side walls provided with centrally-located openings b and b' and the lower opening C, which is considerably wider than the side openings. Hinged adjacent each outer end of said runway is a pivoted platform D, which is pivoted at c and has its inner end extending to about the center of the opening C, and it is so weighted or balanced that it is held in a practically horizontal position. Above said platform D is a hinged or pivoted member E, which is pivoted at d, and connecting the rear end thereof with the forward end of the platform D is a bar F, and said member E is normally held in a horizontal position by said bar F. By this construction it will be readily seen that any weight upon the rear end of the platform forces it downward, and thus the bar F, carried by the outer end, is forced upward, and as it is connected to the rear end of the upper plate the outer end is forced down to meet the said outer end of the platform. In the modification shown at the right in Fig. 2 the platform is pivoted near its outer end and the upper plate pivoted at its extreme inner end and connected by a bar G, which is pivotally secured to the said platform and plate intermediate their ends. By this construction it will be readily seen that any weight upon the inner end of the platform will force it down, and thus the outer end of the upper plate is drawn down upon the outer end of the platform, thus closing the opening behind the animal. To prevent the said platform from going too far down, I provide the under side of the runway with the transverse bar H, which also supports the platform when the weight of the animal is thereon and prevents the strain from coming on other portions of my device. It will be readily seen that I provide one of said platforms and mechanism for working the same at each end of the runway. The said runway, as before stated, being supported on the lower wall of the openings a and a', and said wall being a little distance above the bottom of the body portion will allow the platforms to swing down below the edge of the runway, so that the outer ends of said runway are completely closed. It will also be readily seen that an animal entering the trap has a clear view all the way through the runway, although I provide a swinging door I, which is held up in a horizontal position by the catch i. The purpose of this is when the animal enters the trap and finds itself sinking it would jump for the opposite platform and trip the same, which closes the opposite end of the runway and might just happen at the time another animal was about to enter the trap from the opposite side. Closing the side openings b and b' are the doors J and J', which are swung from their upper edges and are adapted to be forced open by the animal after it has found itself inclosed. I provide one end of the body portion with the opening L, having a door M, by means of which the animals are removed from the trap.

Having thus described my invention, what I claim, and desire to secure by Letters Patent, is—

1. In an animal-trap, the combination with a body portion having oppositely-arranged openings above the bottom, of a removable runway extending through said body portion and supported by the lower walls of said openings, means for automatically closing the ends of said runway, said runway having intermediate openings in its sides, and swinging doors closing said openings, substantially as described.

2. In an animal-trap, the combination with a body portion having oppositely-arranged openings above its bottom, of a runway extending through the body portion and resting on the lower walls of the said openings, intermediately-pivoted platforms carried by the side of said runway adjacent the ends thereof, intermediately-pivoted members above said platforms, bars connecting the outer ends of the platforms with the inner ends of the upper member, a swinging member extending transverse the runway intermediate its ends, and swinging doors carried by the sides of said runway opposite the intermediate swinging member, substantially as described.

3. In an animal-trap, the combination with a body portion having oppositely-arranged openings above the bottom, of a removable runway extending through said body portion and supported by the lower walls of said openings, means for automatically closing the ends of said runway, said runway having intermediate openings in its sides, swinging doors closing said openings, and a vertically-swinging screen transverse the runway opposite the said doors, substantially as described.

In testimony whereof I have hereunto set my hand in the presence of two subscribing witnesses.

ELIAS M. WALKER.

Witnesses:
H. W. ROY,
A. M. HILL.